April 10, 1951     J. W. WILEY     2,547,989
METHOD OF MAKING MOTTLED COMPRESSED CORK ARTICLES
Filed Jan. 24, 1949
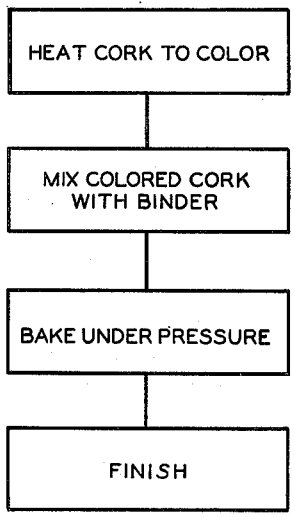
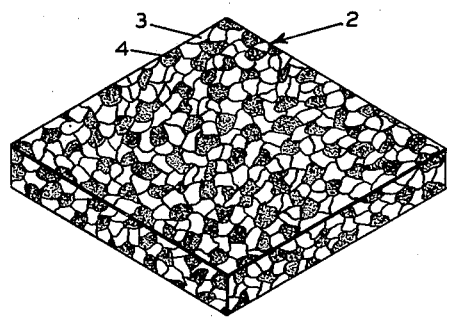
Inventor
JOHN W. WILEY
Attorney Patented Apr. 10, 1951

2,547,989

UNITED STATES PATENT OFFICE 2,547,989

METHOD OF MAKING MOTTLED COMPRESSED CORK ARTICLES

John W. Wiley, Lancaster, Pa., assignor to Armstrong Cork Company, Lancaster, Pa., a corporation of Pennsylvania Application January 24, 1949, Serial No. 72,317

11 Claims. (Cl. 18—47.5)

This invention relates to a method of making compressed cork articles, and is concerned more particularly with the manufacture of articles such as cork tile and the like.

At the present time, cork tile is manufactured by compressing cork granules in a mold to a thickness of about one inch and placing the mold in a heated oven and baking at a temperature of 375° F. to 425° F. for three hours. The natural resin of the cork is employed as the binder. The final product is monocolored.

It is an object of this invention to provide a method of making compressed cork articles in which novel color effects are obtained without the use of dyes, pigments, and other coloring agents.

A further object of the invention is to provide a method of making cork articles by which the granules of cork will be expanded and freed of a substantial portion of the natural resinous material present in the granules, particularly those which are water-soluble, and a coherent product produced with an extraneous binder.

Another object of this invention is to provide a method of making compressed cork articles in which the granules are firmly bonded together with an extraneous bonding agent and in which the cork granules, or at least some of them, have had their natural color changed by heating them prior to bonding them together.

According to my invention, natural cork which has a light tan color is ground into granules and these granules are subjected to heat at an elevated temperature and for a period of time sufficient to change the light tan color to a chocolate brown to black color. When natural cork is heated with steam, for example, to a temperature above 300° F. the color of the cork changes, and in a short time a chocolate brown to black color is obtained, depending upon the temperature of the steam employed, the duration of the treatment, and the size of the cork granules. The preferred temperature range is between 425° F. and 475° F. and the duration of the treatment will be dependent upon the size of the granules and the method of steaming. If the cork granules are disposed in a wire basket and steam fed through the basket from the top, a longer period of steaming will be required in order to obtain the desired color in the granules near the bottom of the basket than would be required if the granules were treated in a rotary steam kiln type device. As an example, a deep chocolate brown color will be obtained with 20 to 40 mesh cork granules in two or three minutes at 450° F., with the wire basket type steam treating equipment. The minimum temperature at which substantial coloration can be obtained is about 300° F. and the maximum temperature is limited by charring or burning of the granules. Temperatures as high as 550° F. may be employed for short periods of time under carefully controlled conditions. With temperatures in the order of 450° F. to 550° F. the time of treatment necessary to obtain the desired color is shortened, and various shades of brown to black color can be obtained by merely heating the granules for longer time to obtain black particles than necessary at the same temperature to secure granules of a chocolate brown color.

In instances where it is desired to distill off a portion at least of the natural resinous and waxy materials present in the cork and particularly the water-soluble constituents, the temperature may be in the range between 500° F. and 550° F. and the duration of treatment may be effected until the desired degree of distillation has been effected.

A very attractive iridescent coloration is observed on the surface of the heat-treated cork granules. When cork granules so treated are severed, it is found that they are colored throughout their extent and not merely on the surface. This is important in the manufacture of products where wear is occasioned, such as cork tile for flooring uses, for the granules are gradually worn down in service.

The cork granules so colored are mixed with a binder, such as a water-soluble phenol formaldehyde resin, and the mixture thus formed is baked, preferably at a relatively low temperature in the order of 225° F. to 275° F. to set the binder and render it substantially insoluble. Pressure is applied to the granules in the mold in which they are baked in order to obtain the desired density in the final product. In cork tile it is desirable to eliminate objectionable openings between adjacent cork granules, and a pressure of 150 to 250 pounds per square inch is usually sufficient to form a mat about 24" x 36" x 3".

The following examples are typical of commercially practicable embodiments of the invention, it being understood the invention is not limited to these embodiments but may be otherwise practiced.

*Example I*

Clean waste cork is ground and sieved to remove particles larger than will pass through a screen having ½ inch openings therein and smaller than will be held on a screen 20 meshes per inch. Such cork granules are known as ½ inch to 20 mesh granulated cork. These cork granules are placed in a suitable receptacle, and superheated steam at a temperature of 450° F. is passed over and between the granules for a period of ten minutes at a rate sufficient to rapidly elevate the temperature of the cork to about the steam temperature. Upon completion of the steaming operation, the cork granules will be a deep chocolate brown in color and the coloration will extend throughout the body of the granules. They will possess an iridescent appearance on the surface, and when severed, this iridescent effect will be observed.

One hundred parts by weight of the colored cork granules are mixed with 10 parts of a 60% water solution of phenol formaldehyde resin of the usual commercial quality. This mixing operation is effected in an internal mixer which distributes the water solution of resin uniformly over the surface of the granules. The mass thus formed is charged into a mold and compressed therein. An initial pressure of 200 pounds per square inch is applied and the mass in the mold is heated. The heating may be effected by disposing the mold within a heated oven, or the mass may be heated dielectrically. The temperature is elevated to about 250° F. and when a heated oven is used baking is continued for a period of thirteen hours. A much shorter heating time will be required where dielectric heating is effected. Upon completion of the baking cycle, the mass within the mold is cooled and then extracted therefrom. The mat is then severed into sheets of the desired thickness and these are cut into tiles of the desired size. In some instances, it may be desirable to finish the surface by a sanding operation, although this is not essential, particularly where the tiles are installed on a floor and sanded subsequent to installation.

*Example II*

An attractive mottled cork tile is produced in accordance with this example by taking the colored cork granules formed in accordance with Example I and mixing 50 parts by weight of such granules with 50 parts by weight of natural cork granules of the original light tan color. These granules are mixed with the binder of Example I, charged into a mold and then baked, being finally finished in the same manner as Example I. Baking at a temperature of about 250° F. does not have any substantial darkening effect upon the light colored granules and there is produced a tile which has a very attractive mottled appearance which extends throughout the thickness of the tile; and, as the same wears away in service, fresh granules, both light and dark in color, are exposed at the surface. The temperature employed is preferably below 300° F., particularly where light colored cork granules are included. Temperatures between 225° F. and 275° F. are satisfactory where the common phenol-aldehyde resin binder of commerce is used.

Where it is desired to have a tile in which the dark coloration predominates, the proportion of dark colored granules may be increased over the light colored granules, and where a light colored tile is desired, the proportioning of light to dark color may be increased. Also, novel effects can be obtained by having the darker or lighter colored granules of larger size than the other granules. For example, the dark colored granules may be of ½ inch to 20 mesh size and the light granules ¼ inch to 20 mesh size. This difference in size produces a particularly attractive surface when the proportions of light to dark color differ widely. Interesting effects can be obtained by mottling together natural light tan colored particles, chocolate brown particles, and black particles and binding them together under heat and pressure. Chocolate brown and black particles may also be mottled as may particles of many different shades of color ranging from the natural light tan colored particles to those that are black. The range of color shades will be determined by the temperature of the baking treatment by which the color change is effected in the different batches of granules.

While it is preferred to use a phenol formaldehyde resin binder, my invention is not concerned with the binder, and any binder which has adequate strength for holding cork granules together may be employed. As examples of binders, the following are listed with the understanding that the invention is not limited to such binders: shellac, cellulose acetate or nitrate, glue, albumen, urea formaldehyde, resorcinol formaldehyde, casein, etc. There is no chemical reaction between the binder and the cork and thus the nature of the binder is not at all critical. Those skilled in the art will recognize that there are many binders other than those listed above which may be used successfully. The quantity of binder employed will vary with the size of the cork granules, the nature of the binder, the product to be produced, and other variable factors. In the manufacture of cork tile and similar products, it is generally desirable to use a minimum amount of binder so that it will not be visually discernible in the finished product. A light colored binder is generally preferred for the same reason where light colored cork granules are employed.

While it is preferred to obtain the desired coloring of the cork granules by the use of steam, a similar coloring can be obtained by heating the cork granules in an oven, but such heating requires a longer period of time and cannot be as nicely controlled.

The pressure applied to the granules will depend upon the nature of the product to be produced and will range from a very slight initial pressure, sufficient to hold the granules in contact with one another for adequate bonding, as in the case of porous products, to a relatively high initial pressure, in the order of 200 pounds per square inch, where a dense, closely knit product is desired. Of course, the pressure will decay to a substantially zero pressure as the binder sets and holds the granules in their initially compressed condition.

In the attached drawing:

Figure 1 is a flow chart showing the preferred sequence of method steps; and

Figure 2 is a perspective view of finished tile of mottled character.

The tile is indicated by the numeral 2 and is made up of light colored cork granules 3 and dark colored cork granules 4. The binder is of such minor volume with respect to the volume of the cork granules that its presence is not perceptible to the naked eye. In Figure 2, the proportioning of light granules 3 to dark granules 4 is about equal.

While I have illustrated and described a preferred embodiment of my invention, it will be understood that the same is not limited thereto but may be otherwise embodied and practiced within the scope of the following claims.

I claim:

1. In a method of making compressed cork articles, such as cork tile and the like having a mottled appearance throughout, the steps comprising subjecting granules of natural cork of light tan color to the action of heat at a temperature above 300° F., continuing the application of heat above such temperature to change the color of said granules throughout their extent to a chocolate brown to black color, mixing said treated granules with granules of natural cork of light tan color and with a heat convertible binder, and forming said mixture into a block by subjecting the mixture to heat while held under compression, said heating of the mass being effected at a temperature below that at which any substantial change in color of the natural cork granules will be effected.

2. A method in accordance with claim 1, in which the baking of the mass is effected at a temperature between 225° F. and 275° F.

3. In a method of making compressed cork articles, such as cork tile and the like, the steps comprising subjecting granules of natural cork of light tan color to the action of superheated steam at a temperature between 425° F. and 475° F. until the color of said granules has changed to a chocolate brown to black color, mixing said treated granules with granules of natural cork of light tan color and a light colored binder, compressing said mass in a mold, and baking the mass while under compression at a temperature below 275° F.

4. A method in accordance with claim 3, in which the mass is baked at a temperature between 225° F. and 275° F.

5. In a method of making compressed cork articles, such as cork tile and the like, the steps comprising subjecting granules of natural cork of light tan color to the action of superheated steam at a temperature between 425° F. and 475° F. until the color of said granules has changed to a chocolate brown to black color, mixing said treated granules with granules of natural cork of light tan color, the average size of said natural cork granules of light tan color differing from the average size of the granules of chocolate brown to black color, coating said granules with a light colored binder, and holding said mass under heat and pressure to bond said granules into a mottled colored block substantially free of fissures.

6. In a method of making compressed cork articles, such as cork tile and the like, the steps comprising subjecting granules of natural cork of light tan color to the action of superheated steam at a temperature between 425° F. and 475° F. until the color of said granules has changed to a chocolate brown to black color, mixing said treated granules with granules of natural cork of light tan color, the light tan colored granules and the chocolate brown to black color granules being proportioned so that one predominates over the other and constitutes the base color and the other the mottle color, mixing said granules with a binder, and compressing said mass and setting said binder to form a mottled colored block.

7. In a method of making compressed cork articles, such as cork tile and the like having a mottled appearance throughout, the steps comprising subjecting granules of natural cork of light tan color to the action of heat at a temperature above 300° F., continuing the application of heat above such temperature to change the color of said granules throughout their extent to color which is in the color range between chocolate brown and black, mixing a heat convertible binder with said colored granules and differently colored granules of cork selected from the group consisting of natural cork of light tan color and cork of different color which has been colored by heat treatment, and forming said mixture into a block by subjecting the mixture to heat while held under compression, said heating of the mass being effected at a temperature below 275° F.

8. A method in accordance with claim 7 in which the binder is a phenol formaldehyde resin.

9. In a method of making compressed cork articles, such as cork tile and the like having a mottled appearance throughout, the steps comprising subjecting granules of natural cork of light tan color to the action of heat at a temperature above 300° F., continuing the application of heat above such temperature to change the color of said granules throughout their extent to a substantially darker brown color than the original light tan color of the natural cork granules, mixing said brown-colored granules with a heat convertible binder and similarly treated granules of a darker brown to black color than the said brown-colored granules, and forming said mottled colored mixture into a mottled colored block by subjecting the mixture to heat while held under compression, said heating of the mass being effected at a temperature below that at which any substantial further change in color of the cork granules will be affected.

10. In a method of making compressed cork articles, such as cork tile and the like having a mottled appearance throughout, the steps comprising mixing with a heat convertible binder a mass of cork granules, a substantial quantity at least of said granules having been colored by heat treatment of granules of natural cork of light tan color at temperatures above 300° F., a portion of said colored granules being of a brown color and another portion being of darker color, both of said portions having been colored by being subjected to said heat treatment but to different extents, and forming said mixture into a block by subjecting the mixture of cork granules and binder to heat while held under compression.

11. A method in accordance with claim 10 in which substantially all of the cork granules have been subjected to superheated steam at a temperature above 425° F. to expel from the cork granules a substantial portion of the natural resinous material within the cork, including those water-soluble constituents which cause natural cork granules to swell upon contact with moisture.

JOHN W. WILEY.

REFERENCES CITED

The following references are of record in the file of this patent:

UNITED STATES PATENTS

| Number | Name | Date |
| --- | --- | --- |
| 997,056 | Grunzweig | July 4, 1911 |
| 1,484,200 | Vincke | Feb. 19, 1924 |
| 1,732,398 | Daniels | Oct. 22, 1929 |
| 1,758,946 | Grupe | May 20, 1930 |
| 2,094,627 | Weisenburg | Oct. 5, 1937 |
| 2,339,458 | Champney | Jan. 18, 1944 |
| 2,490,766 | Abbott | Dec. 13, 1949 |